United States Patent

Rosas et al.

[11] Patent Number: 5,974,081
[45] Date of Patent: Oct. 26, 1999

[54] SPREAD SPECTRUM BAND TRANSCEIVER

[75] Inventors: Luis A. Rosas, Lanham; Robert E. Watson, Mt. Airy, both of Md.; Douglas M. Farinelli, Springfield, Va.; Brian T. Koenigsmark, Marriottsville, Md.

[73] Assignee: Watkins-Johnson Company, Palo Alto, Calif.

[21] Appl. No.: 08/716,859

[22] Filed: Sep. 19, 1996

Related U.S. Application Data

[60] Provisional application No. 60/003,972, Sep. 19, 1995.

[51] Int. Cl.⁶ .................................................. H04B 1/713
[52] U.S. Cl. ........................... 375/202; 375/316; 455/315
[58] Field of Search .................................. 375/202, 316; 455/266, 340, 339, 315, 314

[56] References Cited

U.S. PATENT DOCUMENTS

| | | | |
|---|---|---|---|
| 5,058,138 | 10/1991 | Figura et al. | 375/334 |
| 5,432,814 | 7/1995 | Hasegawa | 375/202 |
| 5,758,296 | 5/1998 | Nakamura | 455/585 |

*Primary Examiner*—Temesghen Ghebretinsae
*Assistant Examiner*—Lenny Jiang
*Attorney, Agent, or Firm*—Flehr Hobach Test Albritton & Herbert LLP

[57] ABSTRACT

A wayside station communicates with a plurality of mobile stations over a wireless communication network. In one embodiment, a wayside station includes a transceiver configured to receive an inbound signal from a mobile station and to transmit an outbound signal to the mobile station. The transceiver has a first switch that is configured to selectively deliver the inbound signal to one of a first band pass filter (BPF) and a second BPF. A second switch is coupled to the first BPF and to the second BPF, and configured to selectively receive the inbound signal from one of the first BPF and the second BPF. A detector is coupled to the second switch and configured to detect the inbound signal, to convert the inbound signal to inbound data and to transfer the inbound data to a processor. The processor decodes the inbound data and processes the data. Outbound data is processed and encoded by the processor, transferred to the transmitter as an outbound signal and communicated to the mobile station over the wireless communication network.

12 Claims, 5 Drawing Sheets

| Byte | Bit → 7 | 6 | 5 | 4 | 3 | 2 | 1 | 0 |
|---|---|---|---|---|---|---|---|---|
| 0 | Sync Word (MSB) = 0xAA ||||||||
| 1 | Sync Word (LSB) = 0x55 ||||||||
| 2 | ACK | CRC2 | D/L | Packet Type |||||
| 3 | Header Data 1 ||||||||
| 4 | Header Data 2 ||||||||
| 5 | Cyclic Redundancy Check (1) ||||||||
| ⋮ | Message Dependent Data (Optional) ||||||||
|   | Cyclic Redundancy Check (2) (Optional) ||||||||

| Channel Number | Frequency Start (GHz) | Frequency Stop (GHz) | 1st LO Synth (GHz) |
|---|---|---|---|
| 1 | 2.4 | 2.4115 | 2.26575 |
| 2 | 2.412 | 2.4235 | 2.27775 |
| 3 | 2.424 | 2.4355 | 2.28975 |
| 4 | 2.436 | 2.4475 | 2.30175 |
| 5 | 2.448 | 2.4595 | 2.31375 |
| 6 | 2.46 | 2.4715 | 2.32575 |
| 7 | 2.472 | 2.4835 | 2.33775 |

5,974,081

SPREAD SPECTRUM BAND TRANSCEIVER

RELATED APPLICATIONS

This application claims priority to provisional patent application Ser. No. 60/003,972 filed Sep. 19, 1995.

FIELD

The present invention relates to a spread spectrum communication network transceiver. In particular, the invention is used in a wireless communication network to achieve reliable communication.

BACKGROUND

Wireless communication networks are becoming increasingly popular due to recently improved wireless communication technologies that make wireless networks relatively inexpensive. For example, there are currently a large number of spread spectrum wireless transceivers available that use the industrial, scientific and medical (ISM) allocated frequency spectrum of 2.4–2.4835 GHz. These types of ISM frequency transceivers are used in applications such as computer Local Area Networks (LANs). Often these transceivers employ a frequency hopping spread spectrum (FHSS) protocol that serves to spread the transmitted signal over a predetermined bandwidth. The FHSS protocol is helpful for alleviating interference and increasing communication bandwidth over the limited frequency spectrum.

In a LAN, for example, reliable communication is considered important but not vital. Reliable communication is relatively easy to accomplish because of the almost ideal conditions associated with stationary transceivers since the transceivers are positioned in advance to avoid obstacles. Moreover, if a data error occurs, the LAN receiver can request data retransmission, where the only inconvenience is a time delay.

However, for a railroad control system, reliable communication is considered vital. When an ISM transceiver is positioned in a mobile station, such as a locomotive, reliable communication is difficult due to impairments such as Doppler shifts from the mobile station movement, specular multipath from signal reflections (from buildings or in tunnels), interference from other local signals such as microwave ovens and RF light bulbs, transmission delays, latencies and anomalous propagations properties of RF signals in a metropolitan environment. Moreover, in a wireless railroad yard configuration with moving locomotives, communication must be reliable in order to efficiently command the locomotives along the tracks and to prevent accidents. These impairments cannot be overcome with conventional radio technology in order to insure reliable communication.

SUMMARY

The present invention relates to a spread spectrum communication network transceiver. In particular, the invention is used in a wireless communication network to achieve reliable communication.

A wayside station communicates with a plurality of mobile stations over a wireless communication network. In one embodiment, a wayside station includes a transceiver configured to receive an inbound signal from a mobile station and a to transmit an outbound signal to the mobile station. The transceiver has a first switch that is configured to selectively deliver the inbound signal to one of a first band pass filter (BPF) and a second BPF. A second switch is coupled to the first BPF and to the second BPF, and configured to selectively receive the inbound signal from one of the first BPF and the second BPF. A detector is coupled to the second switch and configured to detect the inbound signal, to convert the inbound signal, to inbound data and to transfer the inbound data to a processor. The processor decodes the inbound data and processes the data. Outbound data is processed and encoded by the processor, transferred to the transmitter as an outbound signal and communicated to the mobile station over the wireless communication network.

Advantages of the invention include reliable communication and reduced signal interference between wayside stations and mobile stations. The invention ameliorates problems associated with large Doppler shifts, severe specular multipath, fading, interference and anomalous RF propagation.

BRIEF DESCRIPTION OF THE DRAWINGS

Additional advantages of the invention will become apparent upon reading the following detailed description and upon reference to the drawings, in which.

DETAILED DESCRIPTION

The present invention relates to a spread spectrum communication network transceiver. In particular, the invention is used in a wireless communication network to achieve reliable communication. Exemplary embodiments are described with reference to a wireless railroad communication and control system utilizing the industrial, scientific and medical (ISM) frequency spectrum of 2.4–2.4835 GHz. Moreover, the exemplary embodiments employ a FSK and FHSS communication protocol.

The exemplary embodiments are described herein with reference to specific configurations and protocols. Those skilled in the art will appreciate that various changes and modifications can be made to the exemplary embodiments while remaining within the scope of the invention.

Wireless Network Configuration

Figure 1:
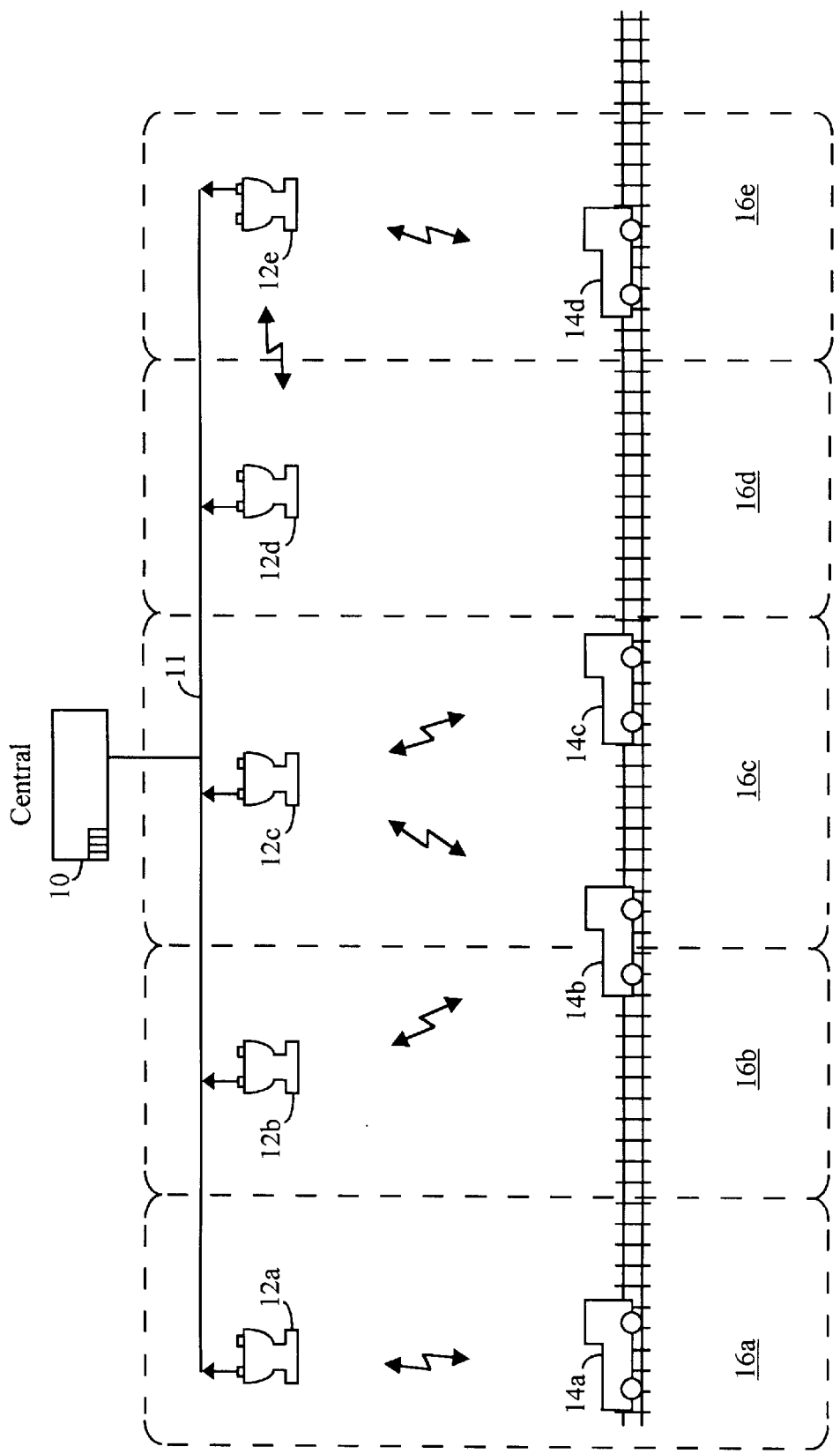
FIG. 1 depicts a wireless communication network showing several wayside stations and several mobile stations.

A first embodiment is described with reference to FIGS. 1 through 4. FIG. 1 is a general illustration of a wireless communication network. A central station 10 communicates over a cable 11 with a plurality of wayside stations 12a–e. Communication over cable 11 can be any type of protocol such as RS-422. Wayside stations 12a–e, in turn, transmit and receive information over a wireless communication network with mobile stations 14a–d. Each wayside station 12a–e has an associated sector 16a–e where the wayside station is responsible for communicating with the mobile stations therein. For example, wayside station 12a is responsible for communicating with all the mobile stations in sector 16a and wayside station 12b is responsible for communicating with all the mobile stations in sector 16b. This division of responsibility among the wayside stations is helpful for distributing processing resources to the location where they can be most efficiently employed. Moreover, the configuration serves to ameliorate the effects of interference signals and obstacles inherent in metropolitan environments. By positioning wayside stations 12a–e in strategic locations along the mobile station route (e.g., railroad) the probability of reliable communication is increased. This includes techniques such as positioning a wayside station in a tunnel or near a turn in the railroad to improve reliable communication. An added technique discussed below involves hopping the communication among a plurality of various hop codes and channels.

In addition to communicating with the mobile stations in an assigned sector, wayside stations can communicate with mobile stations outside of their respective sectors. This type of communication is helpful when a mobile station transits from a first sector to a second sector and needs to develop a wireless link with a new wayside station. In FIG. 1, note that mobile station 14b communicates with both wayside station 12b and 12c when it transits from sector 16c to 16b. When this happens, central 10 instructs wayside station 12c to hand off communication to wayside station 12b. This level of hand-off control is performed by central 10.

However, when multiple mobile stations are located within one sector, the wayside station must communicate with all the mobile stations therein. Note that wayside station 12c communicates with mobile station 14b and 14c in sector 16c. Single and multiple mobile station communication is within the scope of the present invention and is described below.

Figures 2, 3:
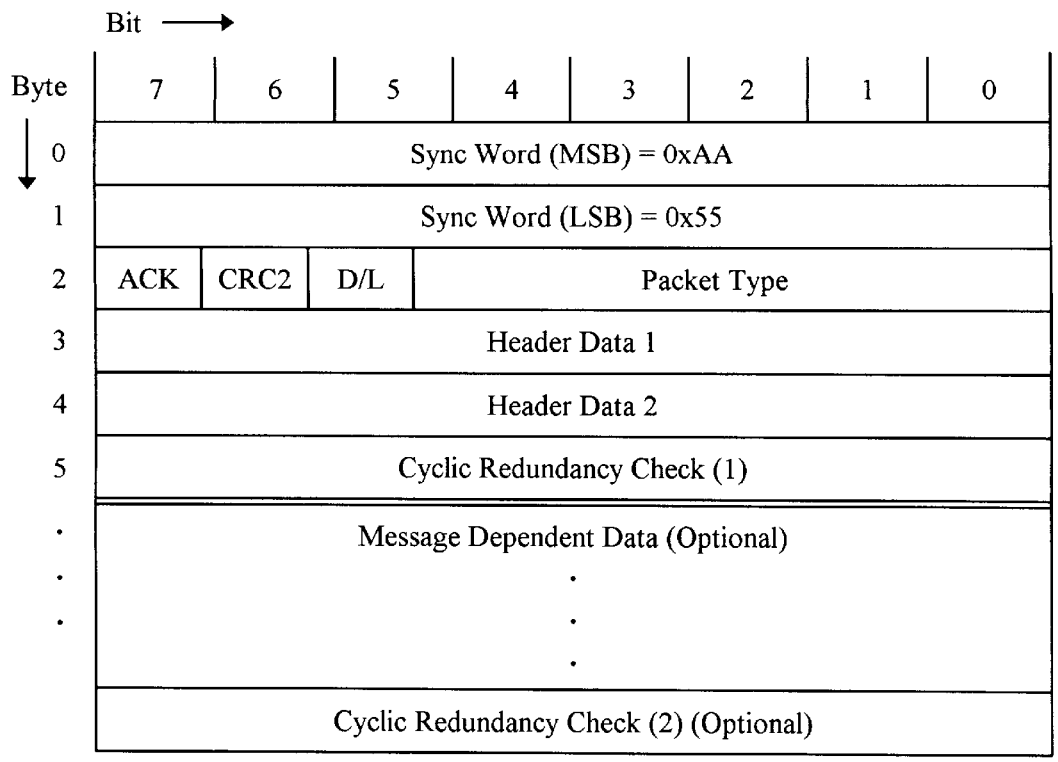
FIG. 2 is an exemplary data packet.
FIG. 3 is a channel and frequency allocation table.

The information communicated between the mobile stations and the wayside stations represents command and control information. This type of information includes locomotive position, locomotive speed and other information. FIG. 2 is an exemplary data packet that represents a message transferred between a base station and a mobile station. Each data packet contains two sync words, an acknowledge, a cyclic redundancy check (CRC), a DL, a packet type, header data, another CRC and a message. The data packet shown in FIG. 2 is relatively detailed and represents only one way of implementing the invention. In operation, the transmitting radio converts a digital data packet into an RF signal for transmission to a receiving radio. The receiving radio then receives the inbound RF signal and converts the inbound RF signal to a digital data packet. The sync words allow the receiving radio to properly clock the incoming signal, and permits the receiving radio enough time to prepare to receive the data packet.

Data Communication

Communication between the wayside stations and the mobile stations is performed by a poll-response technique. The preferred technique is the Aloha poll-response system, which is known in the art. In general, this technique involves the wayside station transmitting a poll signal on a predetermined channel and hop code, and waiting for a mobile station to respond on a second predetermined channel and hop code. Referring to FIG. 2, the data packet for a generic poll signal can be as simple as two sync words and a packet type indicating a poll signal.

FIG. 3 is a channel and frequency allocation table for the RF communication link between the wayside stations and the mobile stations. The 83.5 MHz frequency spectrum between 2.4–2.4835 GHz is divided into 7 channels that each occupy approximately 11.5 MHz. Each of the 7 channels is further divided into 81 distinct frequencies at approximately 140 KHz intervals.

The frequency hopping spread spectrum (FHSS) technique described below allows for 4 communication links in each 11.5 MHz channel. This allocation permits each wayside station to service up to 28 mobile stations in each sector.

A single wayside station to single mobile station communication is as follows. A wayside station issues a poll on a predefined channel and hop code. The poll signal is unique for each wayside station. A mobile station within the sector then responds to the poll on a predefined channel and hop code. The wayside station instructs the mobile station to change to an assigned first channel and first hop code. Once the mobile station is on the first channel and first hop code, the communication link is established and the communication commences. The assigned first channel and hop code is selected to avoid other active communication links and poll-responses.

If a second mobile station is within the same sector, the second mobile station will also respond to the poll signal on the same predetermined frequency and hop code. The Aloha poll-response system provides a mechanism for avoiding collisions. An example of a simple system for avoiding collisions is a random hold-off time delay assigned to each mobile station so that the response to the poll is transmitted at a unique time for each mobile station. This permits the wayside station to sequentially instruct the mobile stations to tune to assigned channels and hop codes without interfering with each other's communication links. For example, after the first channel and hop code is assigned as described above, the wayside station then assigns a second channel and hop code to the second mobile station after it responds to the poll. This type of order preserves communication reliability.

The hop code is an important aspect of the invention and is chosen to ameliorate the problems described above. In the ISM band, narrowband interference is expected. A novel fast frequency hopping technique provides improved performance against narrowband interference over direct sequence techniques. Fast frequency hopping ensures that errors due to multipath fading and narrowband interference will appear to the receiver to be random. By comparison, a slow frequency hopping technique or direct sequence technique provides little resistance to narrowband interference because less frequency bandwidth is utilized in a given time period. Further, a forward error correction technique is employed to correct errors that may still arise due to interference.

A master-slave relationship exists between the wayside station and the mobile station. The wayside station is responsible for assigning the channel and the hop code to the mobile station. In the communication protocol, each data bit is frequency hopped with a pseudo-random hop sequence within the assigned channel. For example, 16 hops are required to transfer a byte, so an average message of 5 bytes requires 80 hops. Since the data rate is 76.8 KHz, the signal hop rate is also 76.8 KHz. The pseudo-random hop code is chosen so that it appears random with the requirement that a valid hop must be at least 9 frequencies from the last hop, which equates to 1260 KHz (140 KHz times 9). For example, a hop from frequency 11 to frequency 72 is allowed, but a hop from frequency 22 to frequency 25 is not. A second feature of the hop code is that the same frequency cannot be used more than 1/75 of the time in a 30 second period. This minimum allowed hop distance and maximum re-use limitation promotes a spectral spread of the information passed over the communication link. This type of spread spectrum communication technique insures reliable communication and resistance to interference.

Radio Configuration

Figure 4:
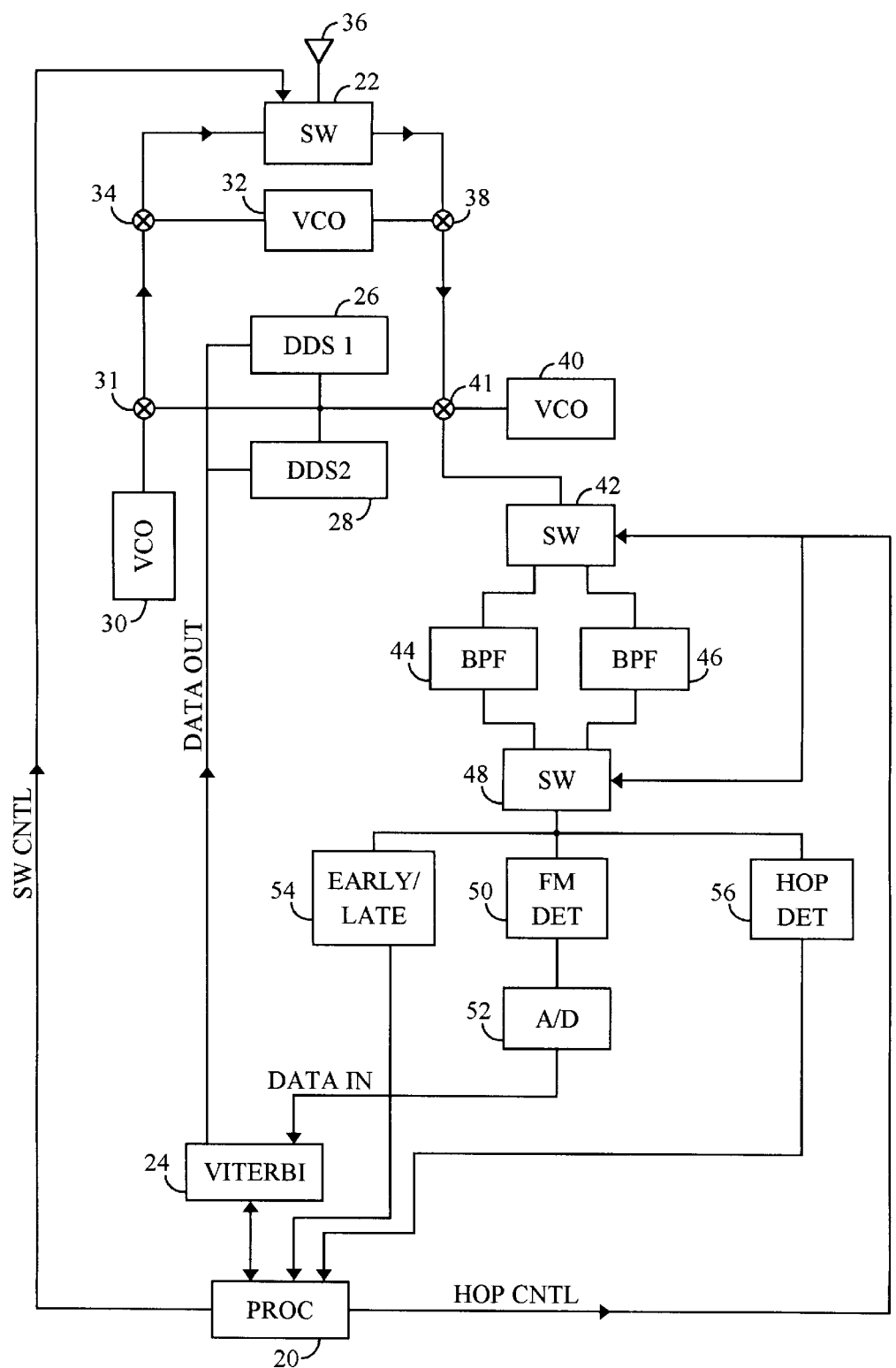
FIG. 4 is a transceiver block diagram according to one embodiment of the invention.

A radio for communicating between the wayside station and mobile station is constructed to perform the described frequency hop sequence. FIG. 4 depicts a half-duplex transceiver according to one embodiment of the invention. In the transmit mode, processor 20 sets switch 22 to a transmit mode and generates an outbound data packet. Processor 20 delivers the outbound data packet to Viterbi encoder/decoder (Viterbi) 24 at a data rate of 38.4 KHz. Viterbi 24 encodes an error detection and correction code (ECC) on the outbound data and generates encoded data at the rate of 76.8 KHz. Viterbi encoding is known in the art and can be performed in a variety of known ways all of which can be used with the invention.

The type of modulation chosen is frequency shift keying (FSK). Viterbi 24 time divides the outbound data between DDS 126 and DDS 228. DDS 26 receives half of the outbound data, at a rate of 38.4 KHz, and converts the outbound data to an FSK modulated signal centered at 11.9 MHz baseband and frequency hopped according to the predefined hopping sequence within the assigned 11.5 MHz channel. DDS 228 receives the other half of the outbound data, at a rate of 38.4 KHz, and converts the outbound data to an FSK modulated signal centered at 11.9 MHz baseband and frequency hopped according to the predefined hopping sequence within the assigned 11.5 MHz channel. For example, DDS 126 receives the even bits (0, 2, 4, 6) and DDS 228 receives the odd bits (1, 3, 5, 7). VCO 30 delivers a 128.1 MHz carrier signal to mixer 31 to up-convert the combined 11.9 MHz outbound baseband signal to an outbound intermediate frequency (IF) signal. VCO 32 delivers a carrier signal set to 2.26–2.34 GHz, according to the assigned channel in FIG. 3, to mixer 34 to up-convert the IF to RF. The outbound RF signal is then transmitted via antenna 36 on the assigned channel according to the predetermined hop code.

An inbound RF signal is received via antenna 36. Processor 20 sets switch 22 to the receive mode. VCO 32 is set to 2.26–2.34 GHz, according to the assigned channel in FIG. 3, to down-convert the inbound RF signal to an inbound IF signal via mixer 38. DDS 126 and DD S228 are alternately set to an expected hop code to match the inbound signal hop code. For example DDS 126 is set to the hop code for the even bits (0, 2, 4, 6) and DDS 228 is set to the hope code for the odd bits (1, 3, 5, 7). The DDS signal is combined with VCO 40 which is set to 117.4 MHz. Mixer 41 mixes the combined DDS and VCO 40 signals to further down-convert the inbound IF signal to a 10.7 MHz inbound baseband signal.

Processor 20 sets switch 42 to alternately deliver the inbound baseband signal to band pass filters 44, 46. Simultaneously, processor 20 sets switch 48 to alternately receive the inbound signal from BPFs 44, 46. The switch is thrown for each expected bit time in the inbound signal so that each bit can be independently filtered and subsequently detected. For example, processor 20 first sets switch 42 to a first position to deliver the inbound baseband signal to BPF 44. Processor 20 then sets switch 48 to a first position to receive the inbound baseband signal passed by BPF 44. Next, processor 20 sets switch 42 to a second position to deliver the inbound baseband signal to BPF 46. Processor 20 then sets switch 48 to a second position to receive the inbound baseband signal passed by BPF 46. This alternate selection continues until processor 20 determines that the inbound reception is complete.

The feature of alternately selecting BPFs 44, 46 on a bit by bit basis is beneficial for several reasons. First, this alternate setting for the BPF 44 and 46 is important to avoid a false detection. Band pass filters are passive devices that have an associated inherent signal decay time, just like any electrical circuit. To accommodate the signal decay time and still achieve the high data throughput of 76.8 KHz, switch 42 is positioned in the inbound signal path to alternately select from the two BPFs 44 and 46 for each expected bit time. A complementary switch 48 is positioned in the inbound signal path after the BPFs 44, 46 to switch the inbound signal band passed energy. Second, alternating the BPFs for each bit allows the transceiver to effectively isolate each bit in time and attenuate any noise associated with prior or anterior signals.

The inbound baseband signal that is passed through switch 48 is delivered to an FSK FM detector 50 that generates an analog signal and sends the analog signal to an analog to digital converter (A/D) 52. A/D 52 generates inbound digital data based on the FSK sequence detected by FM detector 50. The inbound digital data is delivered to Viterbi 24 at a data rate of 76.8 KHz. Viterbi 24 strips the ECC and delivers the decoded inbound digital data to processor 20 at a data rate of 38.4 KHz. Processor 20 then constructs the data packet according to FIG. 2 and performs the functions required by the data packet instruction.

The inbound signal from switch 48 is also delivered to an early/late detector 54 and a hop detector 56. Early/late detector 54 sends an early/late signal to processor 20 as a type of feedback from the inbound baseband signal. Processor 20 processes the early/late signal and adjusts the timing of switches 42, 48 as required to maintain synchronization. Hop detector 56 sends a hop detector signal to processor 20 as a type of feedback from the inbound baseband signal. The hop detector signal is activated when a detection is detected, and it causes the processor to begin its hop code sequence.

Figure 5:
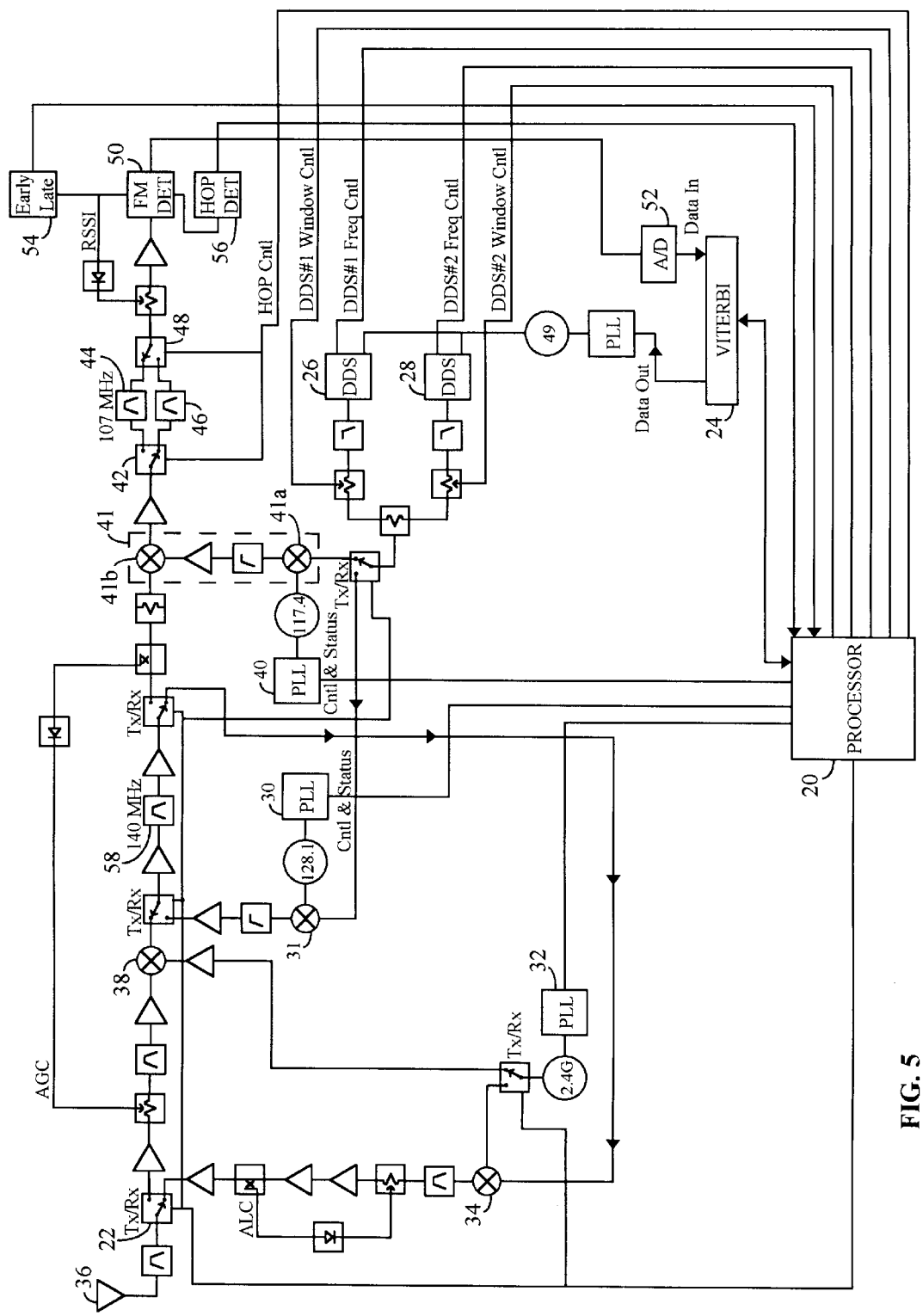
FIG. 5 is a transceiver block diagram according to another embodiment of the invention.

A detailed schematic of another embodiment of a transceiver is shown in FIG. 5. Common elements with FIG. 4 are commonly numbered, and many of the elements in FIG. 4 correspond to a plurality of elements in FIG. 5. The elements in FIG. 5 are depicted in accordance with standard engineering notation.

In particular, mixer 41 in FIG. 4 is replaced with mixers 41a and 41b in FIG. 5. Mixer 41a combines an expected baseband hop code signal generated by DDS 26, 28 with a 117.4 MHz IF oscillator signal. Mixer 41b down-converts the inbound IF signal with the combination of the baseband DDS signal and the IF oscillator to down-convert the inbound IF signal to baseband according to the expected hope code.

Note that a 140 MHz BPF 58 is shared in the receive path and the transmit path. The sharing of BPF 58 is permitted because the transceiver is half-duplex—it cannot simultaneously transmit and receive. The design is chosen because it is more efficient to share the BPF than to build two separate BPFs for the receive path and the transmit path.

Note that switch 42 receives a hop control signal input to alternately deliver the inbound signal to BPF 44 and 46, and that switch 48 also receives the hop control signal to alternately deliver the inbound signal to FM detector 50, early/late detector 54 and hop detector 56. FM detector 50 also generates a received signal strength indication (RSSI) measurement for post processing evaluation that helps processor 20 and central 10 to determine which wayside station should service each MS.

Digital Processor

Figure 6:
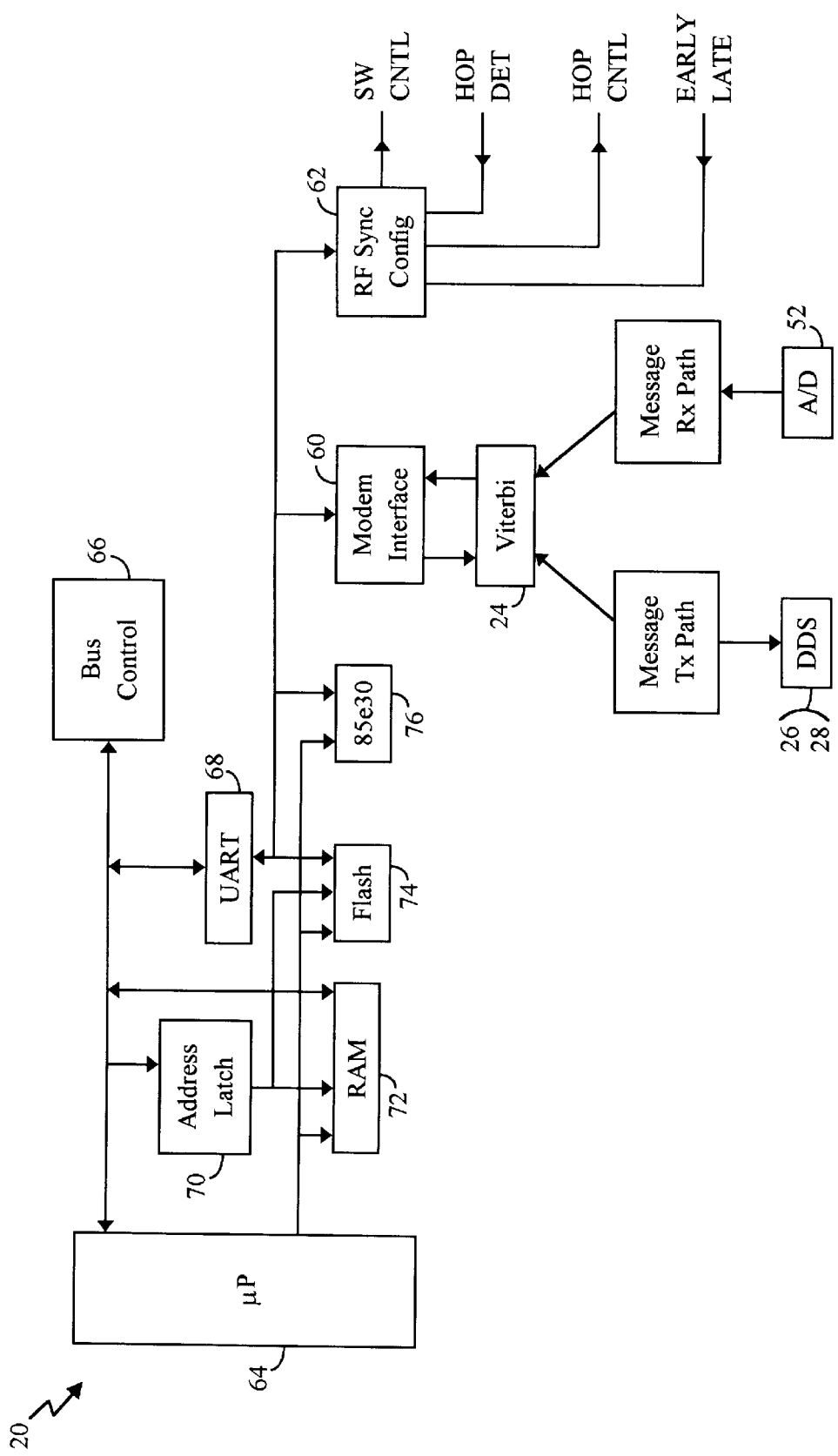
FIG. 6 is a processor block diagram according to one embodiment of the invention.

FIG. 6 depicts a digital processor 20 according to one embodiment of the invention. Processor 20 includes a modem interface 60 for receiving inbound data from Viterbi decoder 24. Modem interface 60 operates at a data rate of 38.4 KHz. Processor 20 includes an RF synchronization control circuit 62 that receives the early/late signal and the hop detector signal. RF synchronization control circuit also transmits the switch control signal and the hop control signal shown in FIG. 4.

Processor 20 further includes a CPU 64 that is a general purpose CPU. CPU 64 is coupled to modem interface 60 and RF synchronization control circuit 62. CPU 64 is also coupled to bus control circuit 66 that controls the communication within processor 20. Bus control circuit 66 is coupled to UART 68 and address latch 70 for accessing various memory modules 72, 74 and other modules 76.

When processor 20 is located at a wayside station, processor 20 is responsible for communicating with each mobile station within the wayside station sector 16, and for communicating with central station 10. To perform this function, processor 20 receives data packets, processes data packets and transmits data packets to any mobile station that requires information or a command.

When processor 20 is located at a mobile station, processor 20 is responsible for communicating with the assigned wayside station on the assigned channel and hop code. To perform this function, processor 20 receives data packets, processes data packets and transmits data packets to the assigned wayside station.

Processor 20 is used to process the messages to and from the complementary communication link transceiver. For example, if processor 20 is located at a wayside station, then processor 20 generates the poll data packet. And, if processor 20 is located at a mobile station, then processor 20 responds to a poll data packet by supplying a corresponding response data packet to the transceiver.

As can be understood by those skilled in the art, processor 20 is a general purpose type computer that is configured in a special way and programmed to execute special instructions to perform the functions described. More over, those skilled in the art will appreciate that any programming language can be used to effect the described processor functions.

Conclusion

Advantages of the invention include reliable communication and reduced signal interference between wayside stations and mobile stations. The invention ameliorates problems associated with large Doppler shifts, severe specular multipath, fading, interference and anomalous RF propagation. The error correction technique combined with the fast frequency hopping technique results in a system having few communication errors. Additionally, the invention provides a radio having little communication latency, which is vital to many real-time communication and control systems.

Having disclosed exemplary embodiments and the best mode, modifications and variations may be made to the disclosed embodiments while remaining within the scope of the invention as defined by the following claims.

What is claimed is:

1. A wayside station for communicating over a wireless network with a mobile station, comprising:
    an antenna configured to receive an inbound RF signal from the mobile station;
    a first oscillator coupled to the antenna and configured to supply a first oscillator signal to down-convert the inbound RF signal to an inbound IF signal;
    a second oscillator coupled to the first oscillator and configured to supply a second oscillator signal to convert the inbound IF signal to an inbound baseband signal;
    a first switch coupled to the second oscillator and configured to selectively deliver the inbound baseband signal to one of a first band pass filter and a second band pass filter;
    a second switch coupled to the first band pass filter and the second band pass filter and configured to selectively receive the inbound baseband signal from one of the first band pass filter and the second band pass filter;
    an inbound baseband detector coupled to the second switch and configured to detect the inbound baseband signal and to convert the inbound baseband signal to inbound data
    an early/late detector coupled to the second switch and configured to generate an early/late signal in response to the inbound baseband signal; and
    a processor coupled to the inbound baseband detector and to the early/late detector and configured to receive the inbound data and to selectively switch said first switch and said second switch in response to said early/late signal.

2. The wayside station of claim 1, wherein:
    said second oscillator signal includes a hop code signal to match an expected inbound signal hop code.

3. The way station of claim 2, wherein:
    said second oscillator signal is configured to hop at least 1260 KHz per hop.

4. The wayside station of claim 1, wherein said inbound baseband detector includes:
    an FM detector configured to generate an analog signal in response to the inbound baseband signal; and
    an A/D converter coupled to the FM detector and configured to generate inbound data in response to the analog signal.

5. The wayside station of claim 1, further comprising:
    a third oscillator coupled to the second oscillator and configured to generate a hop code signal to match an expected inbound signal hop code; and
    wherein the second oscillator signal includes the hop code signal to match the expected inbound signal hop code.

6. The wayside station of claim 5, wherein:
    said second oscillator signal is configured to hop at least 1260 KHz per hop.

7. A method of receiving a signal at a wayside station from a mobile station communicating over a wireless network, comprising the steps of:
    receiving an inbound RF signal from the mobile station via an antenna;
    supplying a first oscillator signal to down-convert the inbound RF signal to an inbound IF signal using a first oscillator;
    supplying a second oscillator signal to convert the inbound IF signal to an inbound baseband signal using a second oscillator;
    selectively delivering the inbound baseband signal to one of a first band pass filter and a second band pass filter using a first switch;
    selectively receiving the inbound baseband signal from one of the first band pass filter and the second band pass filter using a second switch;
    detecting the inbound baseband signal from the second switch and converting the inbound baseband signal to inbound data using a baseband detector;
    generating an early/late signal in response to the inbound baseband signal using an early/late detector; and
    selectively switching said first switch and said second switch in response to said early/late signal.

8. The method of claim 7, wherein:
    said step of supplying a second oscillator signal includes the step of supplying the second oscillator signal that includes a hop code signal to match an expected inbound signal hop code.

9. The method of claim 8, wherein:

said second oscillator signal is configured to hop at least 1260 KHz per hop.

10. The method of claim 7, wherein said step of detecting the inbound baseband signal from the second switch and converting the inbound baseband signal to inbound data using a baseband detector includes:

generating an analog signal in response to the inbound baseband signal using an FM detector; and generating inbound data in response to the analog signal using an A/D converter.

11. The method of claim 7, further comprising the steps of:

generating a hop code signal to match an expected inbound signal hop code using a third oscillator; and wherein the second oscillator signal includes the hop code signal to match the expected inbound signal hop code.

12. The method of claim 11, wherein:

said second oscillator signal is configured to hop at least 1260 KHz per hop.

* * * * *